United States Patent
Nguyen

(10) Patent No.: US 10,085,171 B2
(45) Date of Patent: Sep. 25, 2018

(54) METHOD OF CONTROLLING MACHINE-TYPE COMMUNICATIONS (MTC) IN A WIRELESS COMMUNICATIONS NETWORK

(71) Applicant: NEC Corporation, Tokyo (JP)

(72) Inventor: Phong Nguyen, Victoria (AU)

(73) Assignee: NEC CORPORATION, Tokyo (JP)

( * ) Notice: Subject to any disclaimer, the term of this patent is extended or adjusted under 35 U.S.C. 154(b) by 12 days.

(21) Appl. No.: 14/379,395

(22) PCT Filed: Jan. 24, 2013

(86) PCT No.: PCT/JP2013/052286
§ 371 (c)(1),
(2) Date: Aug. 18, 2014

(87) PCT Pub. No.: WO2013/121892
PCT Pub. Date: Aug. 22, 2013

(65) Prior Publication Data
US 2015/0009813 A1  Jan. 8, 2015

(30) Foreign Application Priority Data

Feb. 17, 2012 (AU) ................................ 2012900601

(51) Int. Cl.
*H04W 28/02* (2009.01)
*H04W 74/00* (2009.01)
(Continued)

(52) U.S. Cl.
CPC ......... *H04W 28/0215* (2013.01); *H04L 67/12* (2013.01); *H04W 4/70* (2018.02);
(Continued)

(58) Field of Classification Search
CPC ................................................ H04W 28/0215
See application file for complete search history.

(56) References Cited

U.S. PATENT DOCUMENTS 7,843,964 B1 * 11/2010 Croak ................. H04L 12/5691
370/395.21
8,620,336 B2   12/2013 Golaup et al.
(Continued)

FOREIGN PATENT DOCUMENTS

EP     2373110     10/2011

OTHER PUBLICATIONS

3rd Generation Partnership Project; Technical Specification Group Radio Access Network; Study on RAN Improvements for Machine-type Communications; (Release 10) II, 3GPP Standard; 3GPP TR 37.868, 3rd Generation Partnership Project (3GPP), Mobile Competence Centre; vol. RAN WG2, No. V0.8.1, Oct. 25, 2011, pp. 1-26.
(Continued)

*Primary Examiner* — John Blanton
(74) *Attorney, Agent, or Firm* — Young & Thompson

(57) ABSTRACT

There is provided a method of controlling machine-type communications (MTC) in a wireless communications network (500). The method includes assigning (610) network identification to a first MTC device (20) of a specified access class. The specified access class substantially simultaneously requests network access to the wireless communications network (500) when a trigger event occurs.

10 Claims, 8 Drawing Sheets

(51) Int. Cl.

| | | |
|---|---|---|
| *H04L 29/08* | (2006.01) | |
| *H04W 48/14* | (2009.01) | |
| *H04W 72/04* | (2009.01) | |
| *H04W 4/70* | (2018.01) | |
| *H04W 8/26* | (2009.01) | |
| *H04L 29/12* | (2006.01) | |

(52) U.S. Cl.
CPC ......... *H04W 48/14* (2013.01); *H04W 72/048* (2013.01); *H04W 74/002* (2013.01); *H04L 61/2038* (2013.01); *H04W 8/26* (2013.01)

(56) References Cited

U.S. PATENT DOCUMENTS

| | | | |
|---|---|---|---|
| 2009/0311967 A1 | 12/2009 | Takase et al. | |
| 2011/0274040 A1* | 11/2011 | Pani ...................... | H04W 4/005 370/328 |
| 2012/0281530 A1* | 11/2012 | Sambhwani ...... | H04W 28/0284 370/230 |
| 2013/0044594 A1* | 2/2013 | Kim ........................ | H04W 4/00 370/229 |
| 2013/0136072 A1* | 5/2013 | Bachmann .............. | H04W 4/00 370/329 |

OTHER PUBLICATIONS

Extended European search report, dated Sep. 2, 2015; Application No. 13749739.2.
International Search Report, PCT/JP2013/052286, Mar. 12, 2013.
Institute for Information Industry (III), Coiler Corporation, Dynamic Separate RACH resources for MTC, [online]. 3GPP TSG RAN WG2 #74 R2-113328, May 9, 2011, [retrieved on Feb. 27, 2013]. Retrieved from the Internet: <URL:http://www.3gpp.org/ftp/tsg_ran/WG2_RL2/TSGR2_74/Docs/R2-113328.zip>.
CATT, Discussion on RACH overload for MTC, [online]. 3GPP TSG RAN WG2 Meeting #70 R2-102780, May 10, 2010, [retrieved on Feb. 27, 2013]. Retrieved from the Internet: <URL:http//www.3gpp.org/ftp//tsg_ran/WG2_RL2/TSGR2_70/Docs/R2-102780.zip>.
3GPP TS 22.368 V11.3.0. [online]. Oct. 3, 2011, [retrieved on Feb. 27, 2013]. Retrieved from the Internet: <URL:http://www.3gpp.org/ftp/Specs/archives/22_series/22.368/22368-b30.zip>.
Japanese Office Action dated Dec. 6, 2016 in corresponding Japanese Patent Application No. 2014-539177 with partial English translation of Japanese Office Action.
VIA Telecom, Dispersed Access Load over Time, 3GPP TSG-RAN WG2 Meeting #71bis, 3GPP, Oct. 15, 2010, R2-105437.

* cited by examiner

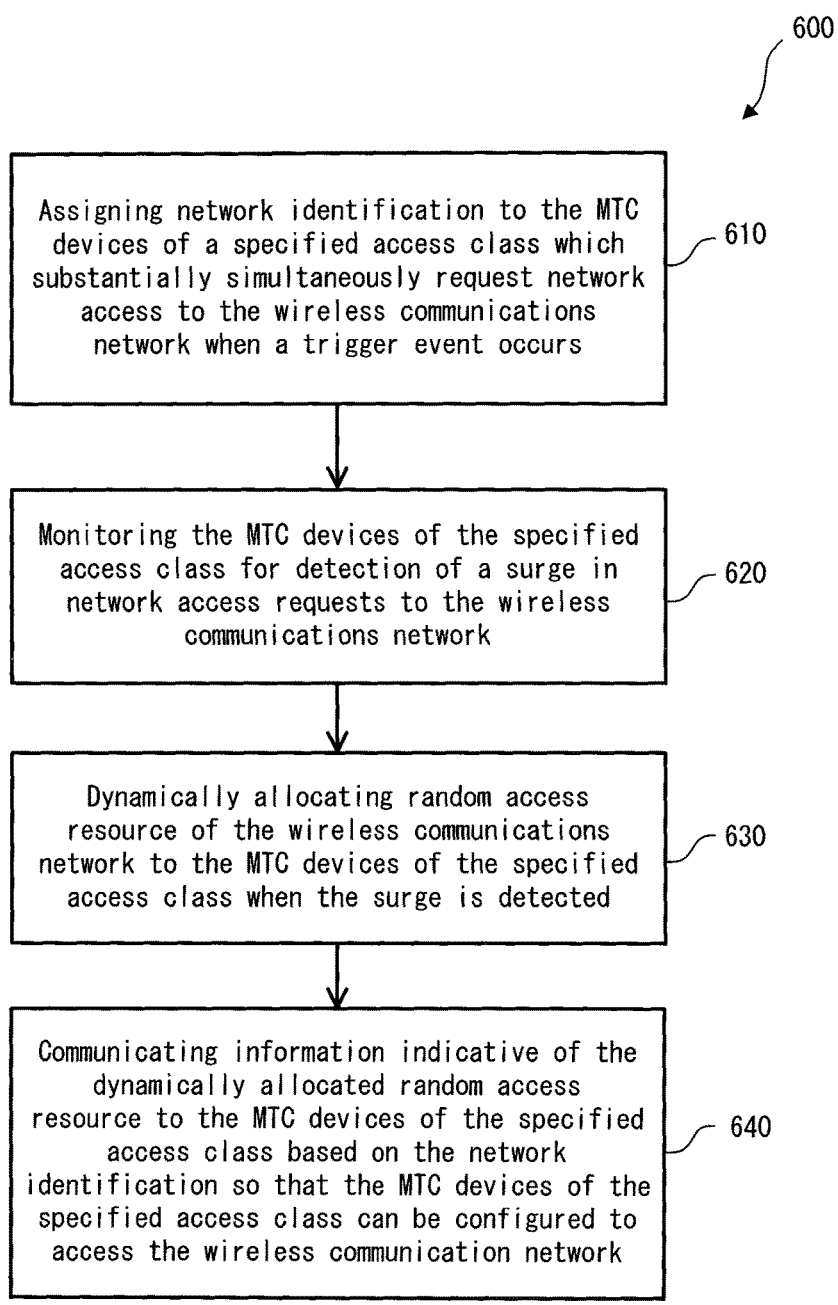

METHOD OF CONTROLLING MACHINE-TYPE COMMUNICATIONS (MTC) IN A WIRELESS COMMUNICATIONS NETWORK

TECHNICAL FIELD

The present invention relates to a method of controlling machine-type communications (MTC) in a wireless communications network

BACKGROUND ART

As wireless communication networks evolve, prevalence of Machine-Type Communication (MTC), from MTC devices in wireless communications networks, is likely to expand due to an expected rise in numbers of MTC devices deployed in these networks, in applications such as smart electricity metering, which are transmitting and receiving data in the networks.

Accordingly, methods of controlling network access have been designed, and in some cases implemented, for Machine-Type Communication (MTC) devices in wireless communication networks. An existing example of a method of controlling MTC device access to a wireless communication network utilises the random access channel (RACH) of the network to provide contention-based access to wireless terminals, such as the MTC device, in the network to request connection setup when no radio resource has been allocated to the wireless terminal. For example, in networks based on the Long Term Evolution (LTE) standard (e.g. Release11 LTE), a wireless terminal sends an access request message to an eNodeB in a network on the RACH (Random Access Channel). This access request message includes a random access preamble, which is selected by the wireless terminal, from two subsets of available preamble sequences (Random Access Resource). The selection of the subset of preamble sequence is determined by the optimum amount of data, as well as power, that the wireless terminal intends to transmit on the uplink transport channel (UL-SCH). Upon the detection of the random access request message, the eNodeB may either accept or deny the access request. If it accepts an access request, the eNodeB transmits a random access response message on the downlink transport channel (DL-SCH) to the wireless terminal including information such as the detected index of the random access preamble sequences, timing correction, scheduling grant, and a Temporary Cell—Radio Network Temporary Identifier (TC-RNTI). Also, the wireless terminals monitor L1/L2 control channels within a network-controlled configurable time window for the random access response from the network.

It will be appreciated by those persons skilled in the art that contention occurs when two or more wireless terminals perform simultaneous random-access attempts using the same preamble sequences. In the event of such a contention, those wireless terminals will listen to the same random access response message on the DL-SCH and therefore have the same Temporary Cell—Radio Network Temporary Identity (TC-RNTI). In this case, multiple wireless terminals will react to the same downlink response message and a collision will occur. In the event of a contention, the eNodeB will resolve the contention in favour of one of the wireless terminals. The failed random access procedure wireless terminals will then "back-off" and perform new access requests at calculated later times. However, as the number of wireless terminals in a network increases with the rise in prevalence of MTC devices, there is a greater probability of contention and a greater number of access attempts will fail. If too many contentions occur, throughput on RACH will be significantly reduced.

As discussed, the anticipated introduction of LTE based low cost Machine Type Communication (MTC) devices, which are expected to be deployed in a specific area, will greatly increase the problem of radio network congestion and signalling network congestion. Additionally, the increasing number of contentions will require the MTC devices to work harder and hence consume more power.

There are several existing solutions that have been proposed to address this problem of radio network congestion. These include:

1. Access Class Barring
2. Separate RACH resources for MTC
3. Dynamic allocation of RACH Resources
4. MTC specific back off scheme
5. Slotted access
6. Pull based scheme.

SUMMARY OF INVENTION

Technical Problem

However, in use, these existing solutions cannot handle certain scenarios, such as when large numbers of MTC devices simultaneously request network access due to, for example, a randomly triggered event; particularly, when large numbers of MTC devices of the same class simultaneously request network access.

For example, consider the scenario when a train passes through a bridge having a plurality of sensors which are MTC devices. The sensors of the bridge may then request network access to transmit monitored data almost simultaneously thus causing congestion in the network. In this scenario, all of the bridge sensors have the same class and have the same traffic type.

In reference to the "Access Class Barring" method; this method can reduce the probability of simultaneous network access requests by limiting network access to certain classes of MTC devices at certain time frames. This method, however, does not work for the above scenario as most or all the bridge sensors (MTC devices) will have the same classification.

In reference to the "Dynamic allocation of RACH Resources" and "Pull based scheme" methods; these methods resolve the issues of Radio Network Congestion and Signalling Network Congestion by predicting when the access load will surge due to MTC devices. Hence, the network, in this case, can dynamically allocate additional RACH resources for MTC devices to use as per the "Dynamic allocation of RACH Resources" method by an MTC server paging groups of MTC devices for UL data transmission in a controlled manner. These methods, however, cannot react to randomly triggered events, such as the train passing through the bridge, and especially do not work when there is a large number of MTC devices of the same class which can simultaneously request network access.

In reference to the "MTC specific Backoff scheme"; this method aims to delay the random access re-attempt after an attempt has been made and rejected. Thus, in this case, high initial collision rates are not avoided which will cost network resources and impact on other wireless terminals in the network as well as terminal processing power.

In reference to the "Slotted Access" method; this method provides dedicated access cycle/slots (similar to paging cycle/slots) for each MTC device to access the network. The access slots are synchronised with the corresponding System Frames and an MTC device is associated with an access slot through its ID (e.g. IMSI: International Mobile Subscriber Identity). Thus, this method provides access based control using MTC device IDs; hence, restricting network access requests on particular slot/times to particular MTC devices. This method can eliminate the issue of simultaneous network access requests from a large number of MTC devices; however, this method delays the data transmission to longer than expected time frames as well as wasting available network resources.

Accordingly, while the existing proposed solutions can potentially resolve some Random Access Network (RAN) overload problems, there is still a need for an improved solution, especially in light of the foreseen large numbers of MTC devices to be deployed in a network simultaneously requesting network access.

Solution to Problem

In one aspect of the present invention, there is provided a method of controlling machine-type communications (MTC) in a wireless communications network, the method comprising:

assigning network identification to a first MTC device of a specified access class.

In one embodiment, the method further comprising:
monitoring the first MTC device of the specified access class for detection of a surge in network access requests to the wireless communications network indicative of the trigger event;
dynamically allocating a random access resource of the wireless communications network to the first MTC device of the specified access class in response to the surge; and
communicating information indicative of the dynamically allocated random access resource to the first MTC device of the specified access class based on the network identification so that the first MTC device of the specified access class is configured to access the wireless communication network based on the information,
wherein the specified access class substantially simultaneously requests network access to the wireless communications network in response to a trigger event that affects the first MTC device of the specified access class.

In one embodiment, the method further comprising:
registering a list which includes the network identification of the first MTC device of the specified access class.

In one embodiment, the method further comprising:
allocating a minimum random access resource of the wireless communications network to the first MTC device of the specified access class based on the list.

In one embodiment, the method further comprising:
allocating a minimum random access resource of the wireless communications network to a second MTC device of a general access class,
wherein the second MTC device requests network access to the wireless communications network individually and/or requests network access according to a preconfigured access scheme.

In one embodiment, the method further comprising:
allocating a shared random access resource of the wireless communications network to the second MTC device of the general access class and the first MTC device of the specified access class based on the list, and dynamically allocating at least some of the shared random access resource to the first MTC device of the specified access class when the surge is detected.

In one embodiment, the method further comprising:
allocating a dedicated random access resource of the wireless communications network to the first MTC device of the specified access class based on the list, and dynamically allocating the dedicated random access resource to the first MTC device of the specified access class when the surge is detected.

In one embodiment, the method further comprising:
registering the list of the network identification of each of the first MTC device of the specified access class on an MTC server configured to receive information from the first MTC device via the wireless communications network.

In one embodiment, the method further comprising:
the MTC server monitoring for a change in the number of MTC devices of the specified access class registered in the list in the wireless communications network for maintenance and/or tracking of the first MTC device of the specified access class in the wireless communications network.

In one aspect of the present invention, there is provided a machine-type communications (MTC) device for communicating over a wireless communication network, the MTC device being of a specified access class, and the MTC device comprising:

a controller configured to:
register the MTC device with a server in the wireless communication network such that a network identification is assigned to the MTC device.

In one embodiment, the controller further configured to:
request network access of the wireless communication network; and
receive information indicative of a dynamically allocated random access resource to the MTC device of the specified access class based on the assigned network identification so that the MTC device is configured to access the wireless communication network based on the information,
wherein the specified access class substantially simultaneously requests network access to the wireless communications network in response to a trigger event that affects the MTC device of the specified access class, and
wherein the random access resource of the wireless communications network is dynamically allocated to the MTC device of the specified access class in response to a surge in network access requests to the wireless communications network indicative of the trigger event.

In one aspect of the present invention, there is provided a server for machine-type communications (MTC) in a wireless communications network, the server comprising:

an assignment unit to assign network identification to a first MTC device of a specified access class.

In one embodiment, the server further comprising:
a monitoring unit to monitor the first MTC device of the specified access class for detection of a surge in network access requests to the wireless communications network indicative of the trigger event;
an allocation unit to dynamically allocate a random access resource of the wireless communications network to the first MTC device of the specified access class in response to the surge; and
a communication unit to communicate information indicative of the dynamically allocated random access resource to the first MTC device of the specified access class based on the network identification so that the first MTC device of the specified access class is configured to access the wireless communication network based on the information,
wherein the specified access class substantially simultaneously requests network access to the wireless communications network in response to a trigger event that affects the first MTC device of the specified access class.

In one embodiment, the server comprises a base station in the wireless communications network.

In one aspect of the present invention, there is provided a method implemented in a machine-type communications (MTC) device for communicating over a wireless communication network, the MTC device being of a specified access class, and the method comprising:

registering the MTC device with a server in the wireless communication network such that a network identification is assigned to the MTC device.

In one embodiment, the method further comprising:

requesting network access of the wireless communication network; and receiving information indicative of a dynamically allocated random access resource to the MTC device of the specified access class based on the assigned network identification so that the MTC device is configured to access the wireless communication network based on the information, wherein the specified access class substantially simultaneously requests network access to the wireless communications network in response to a trigger event that affects the MTC device of the specified access class, and wherein the random access resource of the wireless communications network is dynamically allocated to the MTC device of the specified access class in response to a surge in network access requests to the wireless communications network indicative of the trigger event.

In one aspect of the present invention, there is provided a method implemented in a server for machine-type communications (MTC) in a wireless communications network, the method comprising:

assigning network identification to a first MTC device of a specified access class.

In one embodiment, the method further comprising:

monitoring the first MTC device of the specified access class for detection of a surge in network access requests to the wireless communications network indicative of the trigger event;

dynamically allocating a random access resource of the wireless communications network to the first MTC device of the specified access class in response to the surge; and communicating information indicative of the dynamically allocated random access resource to the first MTC device of the specified access class based on the network identification so that the first MTC device of the specified access class is configured to access the wireless communication network based on the information, wherein the specified access class substantially simultaneously requests network access to the wireless communications network in response to a trigger event that affects the first MTC device of the specified access class.

In one embodiment, the server comprises a base station in the wireless communications network.

In one aspect of the present invention, there is provided a wireless communications network for controlling machine-type communications (MTC), the wireless communications network comprising:

a first MTC device of a specified access class; and a server which assigns network identification to the first MTC device of the specified access class.

In one embodiment, the specified access class substantially simultaneously requests network access to the wireless communications network in response to a trigger event that affects the first MTC device of the specified access class, wherein the server monitors the first MTC device of the specified access class for detection of a surge in network access requests to the wireless communications network indicative of the trigger event, wherein the server dynamically allocates a random access resource of the wireless communications network to the first MTC device of the specified access class in response to the surge, and wherein the server communicates information indicative of the dynamically allocated random access resource to the first MTC device of the specified access class based on the network identification so that the first MTC device of the specified access class is configured to access the wireless communication network based on the information.

In one embodiment, the server comprises a base station in the wireless communications network.

In one aspect of the present invention, there is provided a method of controlling access to a wireless communications network for Machine-Type Communication (MTC) devices, the method comprising:

assigning network identification to ones of the MTC devices of a specified access class which substantially simultaneously request network access to the wireless communications network when a trigger event affects said ones of the MTC devices of the specified access class;

monitoring the MTC devices of the specified access class for detection of a surge in network access requests to the wireless communications network indicative of the trigger event;

dynamically allocating random access resource of the wireless communications network to the MTC devices of the specified access class when said surge is detected; and communicating information indicative of the dynamically allocated random access resource to the MTC devices of the specified access class based on respective ones of the network identification so that the MTC devices of the specified access class can be configured to access the wireless communication network based on the information.

In one aspect of the present invention, there is provided a Machine-Type Communication (MTC) device for communicating over a wireless communication network having a serving wireless base station, the MTC device being of a specified access class of MTC devices which substantially simultaneously request network access to the wireless communications network when a trigger event affects the MTC devices of the specified access class, and the MTC device comprising:

a controller configured to:
register the MTC device with the serving base station in the wireless communication network such that a network identification is assigned to the MTC device;
request network access of the wireless communication network; and
receive information indicative of a dynamically allocated random access resource to the specified access class of the MTC devices based on the assigned network identification so that the MTC device can be configured to access the wireless communication network based on the information,
wherein the random access resource of the wireless communications network is dynamically allocated to the MTC devices of the specified access class when a surge in network access requests to the wireless communications network indicative of the trigger event is detected by the serving base station.

For example, a large number of MTC devices of the same class simultaneously request network access when triggered by a sudden, random event causing a surge in network access requests. The method of controlling network access for these MTC devices thus minimises contention of network access requests by dynamically allocating random access resource of the network when the surge is detected, which also minimises the impact on MTC devices of other access classes as well as non MTC devices in the network.

In an embodiment, an access class dependent approach is used to independently control wireless network access of MTC devices of a specified access class (e.g. special access class), which can be a massive number of devices that simultaneously request network access when triggered by a sudden random event. This approach also controls access to MTC devices of other general access classes, which randomly and/or timely request network access in a controllable manner; that is, according to a preconfigured access scheme. Due to the nature of the applications of the specified access class MTC devices, the majority of these devices are geometrically fixed (not mobile) for their service life time once they have been deployed and they are also highly concentrated in numbers under one or more serving base stations of the wireless network. Also due to the nature of service of the MTC devices of the special access class, when a random event triggers at least one device in its group to request network access, other devices in the same group will also be triggered simultaneously to request network access and that creates a surge in network access requests.

More specifically, in the embodiment, the base station can control the load of a random access channel of the network using the above described access class-dependent approach by:

1. assigning unique network MTC IDs (e.g. RC-RNTI) when the MTC devices register for the first time with a serving wireless network,
2. establishing a registration list of registered MTC devices of special access class under its service for dynamic random access resource allocation,
3. implementing a method for detecting a SURGE in network access requests from the special access class MTC devices,
4. implementing a dynamic access resource allocation scheme to accommodate the SURGE in network access requests from the special access class MTC devices, and
5. informing network access parameters to the special access class of MTC devices. Based on the informed network access parameters, the MTC devices of special class derive frame, subframe, sequence and any other access parameters corresponding to its valid assigned MC-RNTI for data transmission.

In one embodiment, the method comprises a random access resource budget allocation scheme implemented by a wireless base station in a communication network. This method includes a minimum random access resource allocated to general access class MTC, minimum random access resource allocated to specified access class MTC, shared random access resource allocated to either general access class MTC devices or specified access class MTC devices or both, and a dedicated random access resource allocated to specific access class. In use, the wireless base station monitors the minimum random access resource allocated to specified (specific) access class MTC for a surge in network access requests from MTC devices of specified access class and/or subclass. Once a surge is detected, the wireless base station dynamically utilises the shared random access resource or dedicated random access resource or both to accommodate for the surge in network access of the specific access class MTC devices.

The access control method implemented in the base station also determines access class and/or subclass of a MTC device(s) during its first registration and then assigns the permanent and unique MC-RNTI if the registering MTC device belongs to a specific access class MTC. The method then establishes and maintains a registration list of the registered MTC devices of specific access class. As such, the base station can determine, using the registration list, the appropriate size of the minimum random access resource allocated to specific access class MTC. As discussed, the base station monitors for random access requests to detect a surge in network access requests from MTC devices of the specific access class and, once a surge has been detected, the base station will update the random access resource and transmit that update to the MTC devices within it serving region.

In addition, each MTC device also implements a procedure to access to the network. In an embodiment, at power-on of a MTC device, this device will perform cell search and system information acquisition. If the MTC device is configured to support an application that classifies it as specific access class or sub-class MTC, it will continue reading the MTC system information and will perform initial random access to get registered and assigned a cell life-time MC-RNTI with the wireless base station. It will be appreciated by those persons skilled in the art that there may be a plurality of access sub-classes of the specified access class, which can be defined for each device type. In any case, in use, when a registered MTC device's application has data to send, this MTC device determines the appropriate application traffic type and performs a reading of the broadcasted MTC system information for up-to-date random access parameters for its class. From the read random access parameters, the MTC device selects the appropriate access control parameters corresponding to its determined traffic class and then accesses the network for data transmission using the selected access control parameters of, for example, System Frame number, Uplink subframe number on which it shall send its random access preamble(s), and preamble sequence in the set of preamble sequences of the determined frame and subframe.

Advantageous Effects of Invention

According to the present invention, it is possible to request network access simultaneously by large numbers of MTC devices.

BRIEF DESCRIPTION OF DRAWINGS

FIG. 7 is a flow chart showing a method of controlling access to a wireless communication network according to an embodiment of the present invention.

DESCRIPTION OF EMBODIMENTS

Embodiments of the present invention will now be described, by way of example only, with reference to the accompanying drawings.

Figure 1:
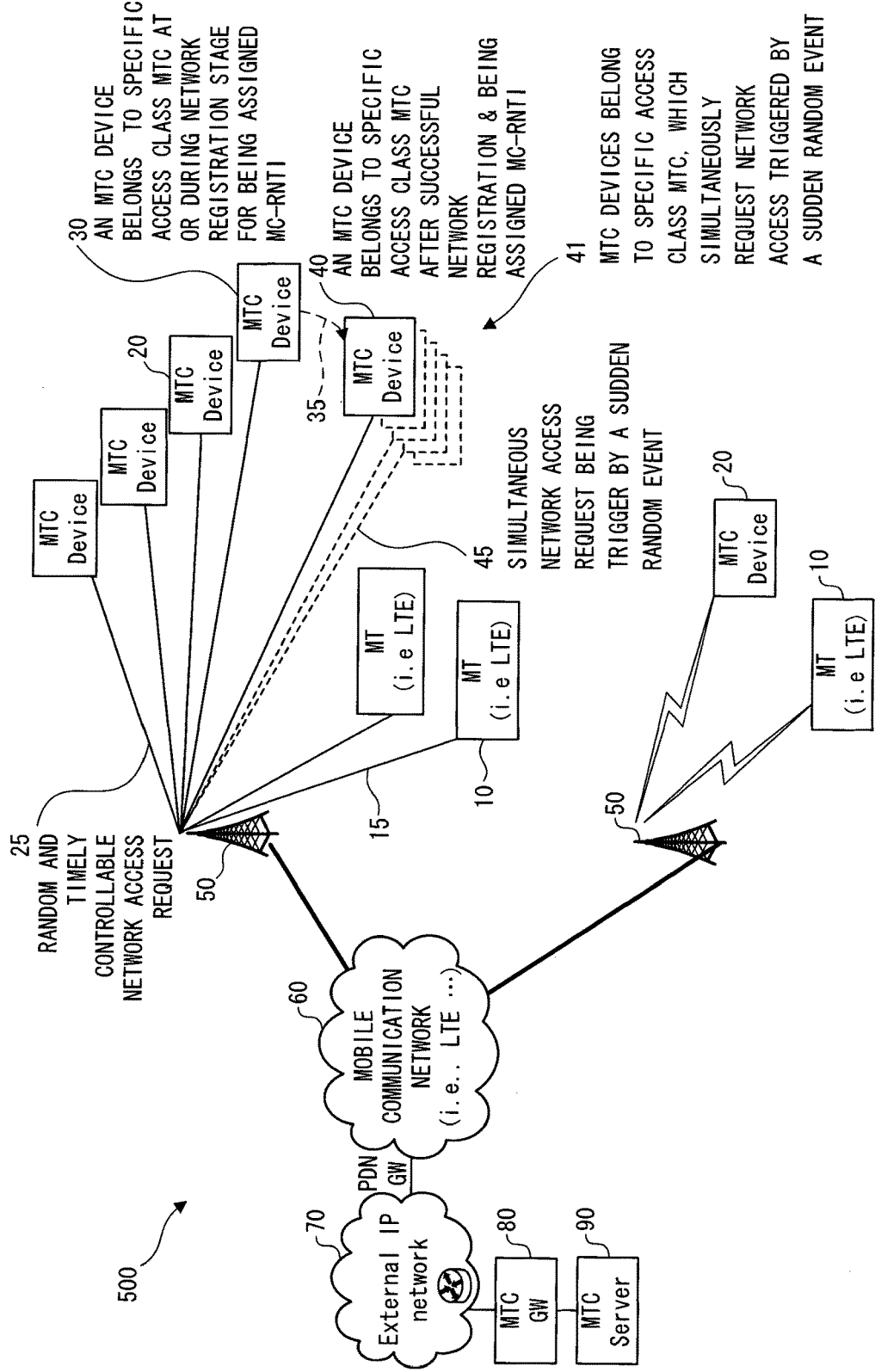
FIG. 1 is a schematic illustration of a wireless communication system supporting Machine-Type Communications (MTC) devices according to an embodiment of the present invention.

According to an embodiment of the present invention there is provided a wireless communication network 500, as shown in FIG. 1, supporting a plurality of Machine Type Communication (MTC) devices 20 30 40. It will be appreciated by those persons skilled in the art that the wireless communication network 500 illustrated in FIG. 1 operates according to any standards that employ a contention-based random access scheme. For illustrative purposes, an exemplary embodiment of the present invention will now be described in the context of a network operating according to the Long Term Evolution (LTE) standard.

The communication network 500 illustrated in FIG. 1 comprises a mobile communication network 60 that connects to an external IP network 70, such as the Internet, via a Packet Data Network Gateway (PDN-GW). The External IP network 70 also provides connectivity between the mobile communication network 60 and one or more MTC servers 90 via an MTC Gateway 80 (MTC GW). The MTC server 90 is responsible, in this case, to provide application services to wireless MTC devices (not shown) that are connected thereto. The communication network 500 illustrated in FIG. 1 further comprises more than one enhanced NodeBs 50 (eNB) that interconnect with the mobile communication network 60 and provides wireless network connectivity and access for wireless terminals.

The wireless terminals comprise MTC devices 20 30 40 for collecting and reporting data over a communication network and non-MTC devices such as mobile terminals 10 (MT). It will be appreciated by those persons skilled in the art that a MT 10 includes wireless devices, such as mobile phones, smart phones, laptop computers, that are used for voice and data communication by human users. MTC, on the other hand, has been defined in 3GPP standards as a form of data communication which involved one or more entities that do not necessarily need human interaction and therefore have a specific type of wireless communication network traffic. 3GPP further defines MTC devices as User Equipment (UEs) or MTs equipped for Machine Type Communication, which communicate through Public Land Mobile Network (PLMN) with MTC server(s) and/or other MTC device(s), and therefore possess specific behaviour in term of network access requests depending on application(s) that an MTC device supports and environment and geometric locations where an MTC device have been deployed. Some examples of MTC devices include: utility metering devices (e.g. electricity, gas, water, etc) with wireless transceivers for reporting usage measurements to MTC servers at predetermined time periods; tracking & tracing devices used in fleet management (e.g. pay as you drive and navigation devices) with transceivers for reporting location information and vehicle information to MTC servers in a random manner; and remote monitoring devices with wireless transceivers for reporting monitoring information to MTC servers.

In an example, the number of MTC devices can be massive (e.g. in order of thousands) and all the devices are fixedly located in a small geometrical area within a serving eNB 50. For example, in the bridge monitoring application described above, a bridge has a plurality of MTC devices in the form of sensors and all the sensors can request network access almost simultaneously for monitoring data transmission when a trigger event occurs such as the arrival of a train passing through the bridge. In this case, the sensors request simultaneous network access in a sudden, random like manner.

The MTC devices 20 30 40 are classified into two classes: a specific access class of MTC devices 40—which, in the example, are massive in number and can simultaneously request network access by a randomly triggered event—and a general access class of MTC devices 20.

The general access class of MTC devices 20 either individually and randomly request network access and/or request network access in a controlled manner.

In use, in order to send or receive data, a wireless terminal in the network 500 must first establish a connection with an eNB 50. Typically, LTE wireless terminals on power-up will perform cell search, cell system information acquisition, and communication network registration. In one example, a wireless terminal, which belongs to a specific access class MTC device (MTC Device 30), performs the action of power-up and network registration with human intervention and therefore its individual network access at initial network registration is controllable. In any event, after that, the wireless terminal enters an IDLE state. In the IDLE state, the wireless terminal does not have an established connection with the eNB 50. Thus, when the wireless terminal in IDLE state has application data to send, it shall wakeup and use a random access procedure to establish wireless connection with the eNB 50 to transmit data. In addition, the wireless terminal in IDLE state also regularly wakes-up after a predefined period of time to monitor for a paging indicator (PI) indicative of data reception.

Currently, in any wireless network with MTC devices, and particularly LTE networks supporting MTC, all MTC devices and non-MTC devices share the same Random Access Resources and therefore MTC devices and non-MTC devices will contend with one another for network access. It is expected, as described above, that the number of MTC devices will grow significantly and particularly the number of MTC devices of a specific access class. These specific class MTC devices will therefore overload the Random Access Network (RAN) as well as Core network and create potential disruption to the network when simultaneously accessing the wireless network.

Furthermore, typically for an LTE system, when such MTC devices 20 30 40 and/or non-MTC devices 10 in IDLE state have application data to send, they shall wakeup and use random access procedure to establish RRC context with an eNB 50 and get C-RNTI assigned. In the embodiment, however, the MTC device 30 of specific access class is assigned a specific MTC Cell—Radio Network Temporary Identity (MC-RNTI) at the initial network registration and this MC-RNTI will be permanently assigned to that MTC device 30 for its life in the current serving eNB 50. After this initial wireless network 500 and/or MTC server 90 registration, the MTC device 30 with permanent assigned MC-RNTI shall become an MTC device 40 as illustrated in FIG.

1. The assigned MC-RNTI, in one example, is also available to its MTC server 90 for the purpose of MTC device maintenance and vandalism control as described later.

In the embodiment, the method of creating and assigning MC-RNTI by the eNB 50 is provides the serving eNB 50 the information on number of MTC devices 40 that have been registered and shall potentially simultaneously request network access when a randomly triggered event occurs within the eNB 50 serving area. With this information, the eNB 50 will be able to dynamically allocate and control its random access resource efficiently as described herein.

Figure 2A:
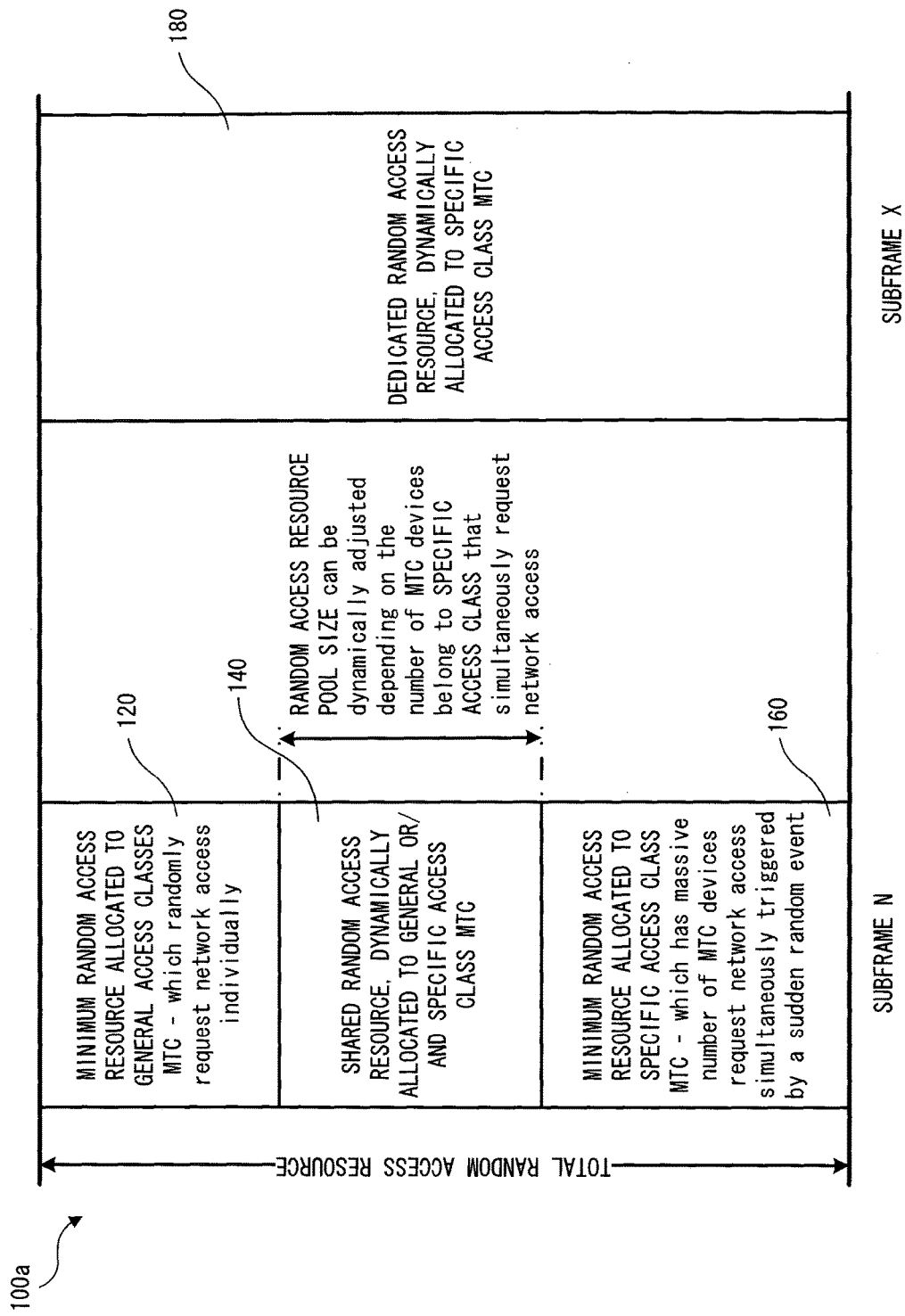
FIG. 2A is a schematic illustration of a random access resource budget allocation scheme according to an embodiment of the present invention.
Figure 2B:
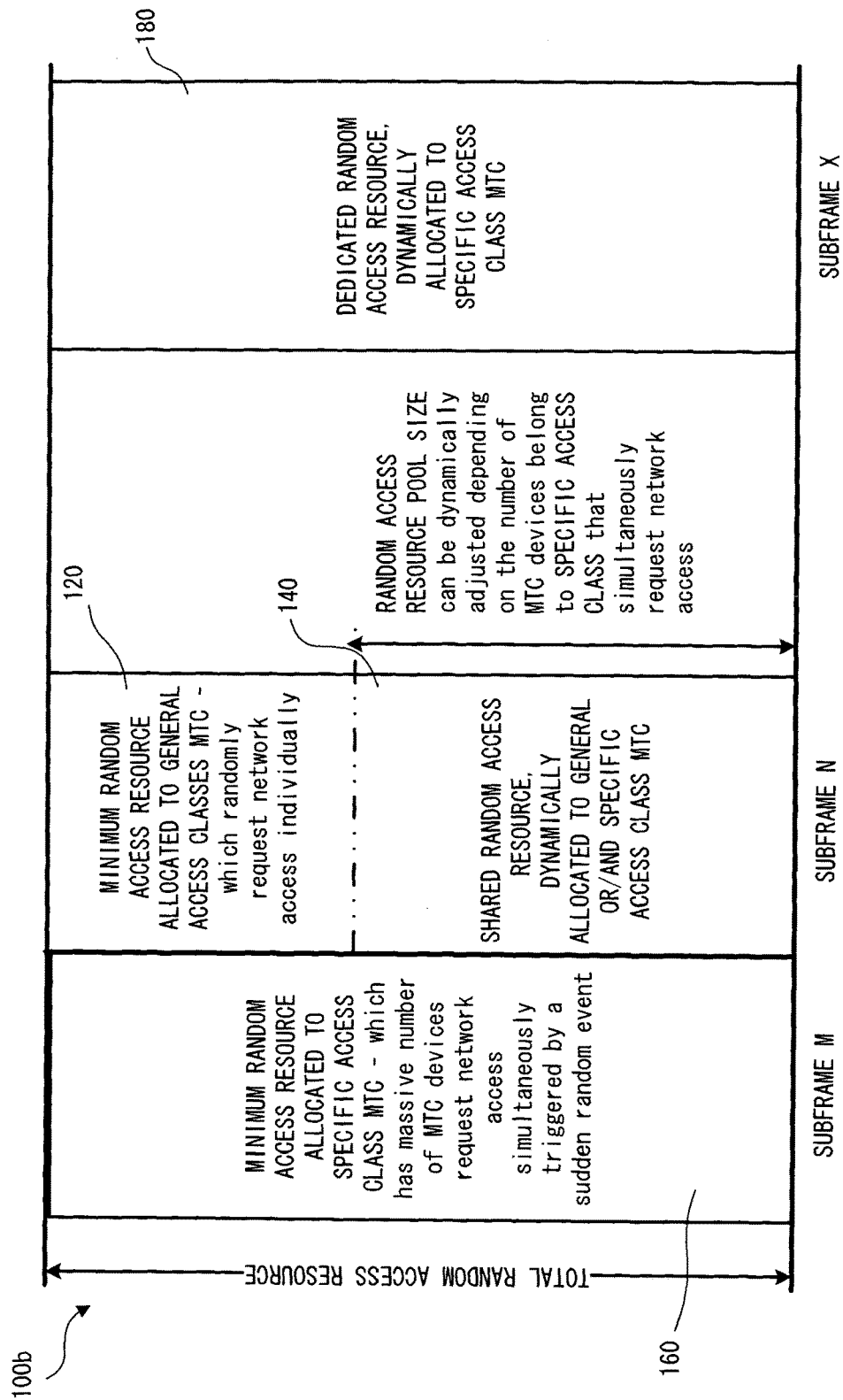
FIG. 2B is a schematic illustration of a random access resource budget allocation scheme according to the embodiment of FIG. 2A.

In one exemplary embodiment of the invention illustrated in FIGS. 2A and 2B, a Random Access Resource Budget Allocation scheme is used to allocate and control the network access of MTC devices 20 30 40 as well as non MTC devices 10. In reference to FIGS. 2A and B, the Random Access Resource Budget Allocation scheme 100*a* and 100*b* comprises four Random Access Resource parts, namely:

1. Minimum random access resource allocated to general access class MTC 120. This random access resource can also be shared with non MTC devices 10 and it can be configured and controlled by the eNBs 50 of FIG. 1. Also, the existing proposed "access class barring" method, as well as other proposed methods, can be utilised to control the load in this area. The size of the minimum random access resource allocated to the general access classes MTC 120 is to be determined at the eNB 50 and controlled by network operator.
2. Minimum random access resource allocated to specific access class MTC 160. This random access resource can only be allocated to group(s) of MTC devices 41, of FIG. 1, which simultaneously request network access by, for example, a sudden randomly trigger event. The minimum random access resource allocated to specific access class MTC 160 can share the same subframe with the minimum random access resource allocated to general access class MTC 120 as being illustrated in system 100*a* of FIG. 2A or it can be allocated on specific subframe(s) as being illustrated in system 100*b* in FIG. 2B. In any case, the size of the minimum random access resource allocated to specific access class MTC 160 shall be determined and configured by the network operator based on the number of MTC devices of special access class MTC that have been registered with the serving eNB 50 and currently holding a valid assigned MC-RNTI. It will be appreciated that the minimum recommended size should be enough to guarantee immediate success in random access of a group of MTC devices for emergency services.
3. Shared random access resource 140. This random access resource is normally allocated to the non MTC devices and general access class MTC, but when the eNB 50 detects a SURGE in number of MTC devices of specific class MTC that the minimum random access resource allocated to specific access class MTC 160 cannot handle, partially or wholly, the shared random access resource 140 shall be used to allocate to MTC devices 40 of specific class MTC.
4. Dedicated random access resource allocated to specific access class MTC 180. This random access resource can only be dynamically configured and allocated to group(s) of MTC devices 41 of FIG. 1 when the eNB 50 of FIG. 1 has detected a SURGE in number of MTC devices of specific access class MTC simultaneously request network access.

Furthermore, in an embodiment, data from the MTC devices of the same class 40 is concatenated to reduce header overhead of small data packets and sent to their common MTC server. This further resolves network congestion caused by massive numbers of MTC devices of the same class which can simultaneously send data to its MTC server by a randomly triggered event.

Figure 3:
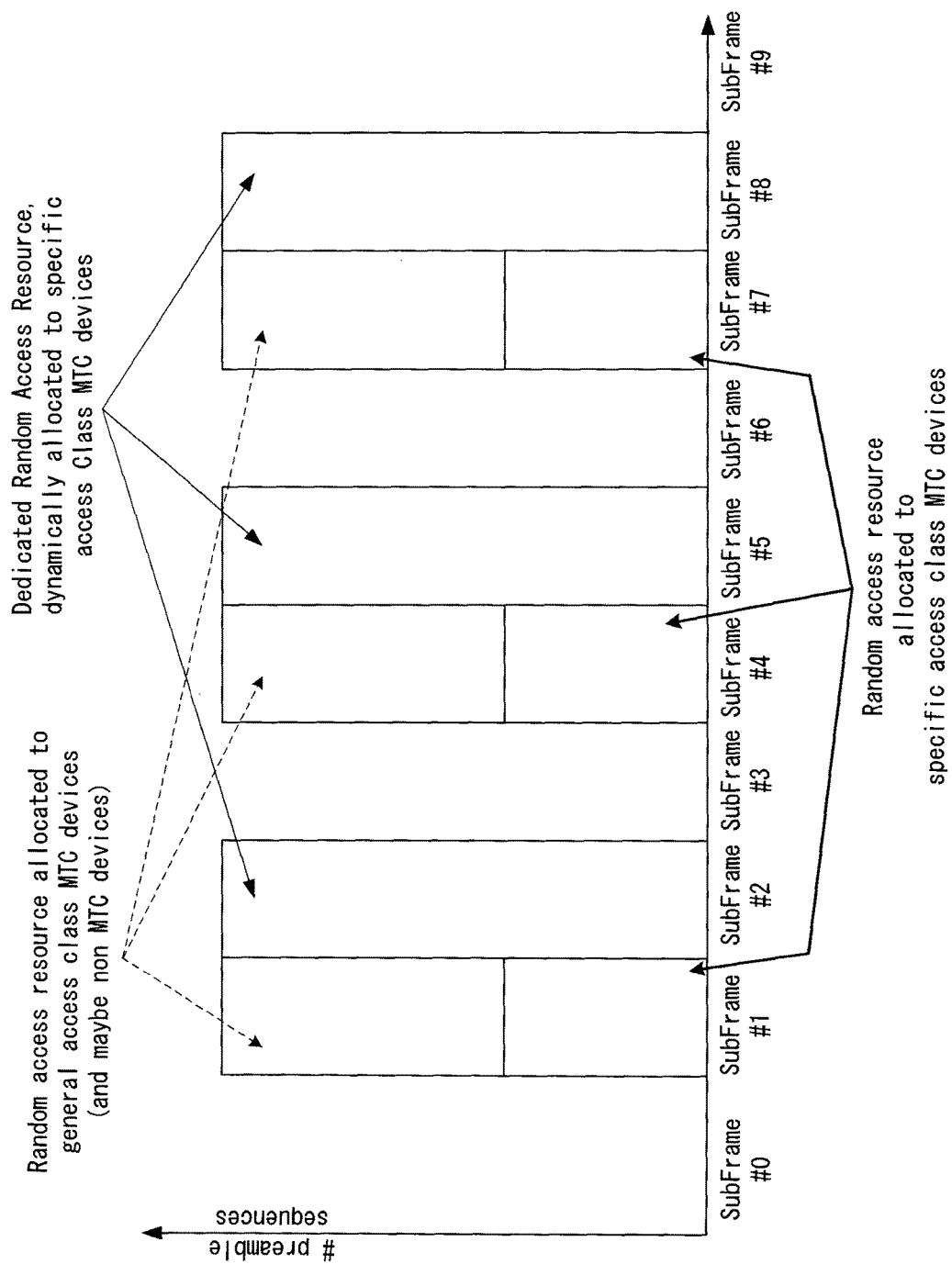
FIG. 3 is a schematic illustration of a random access resource allocation on a particular radio frame according to an embodiment of the present invention.

FIG. 3 provides an example of random access resource allocation on a particular radio frame in line with the above description of the Random Access Resource Budget Allocation scheme shown in FIGS. 2A and 2B. In the example, the general access class MTC' s random access resource information and specific access class MTC's random access resource can be transmitted along with cell System Information or in MTC System information depending on the specific implementation of MTC system information broadcasting.

Figure 4:
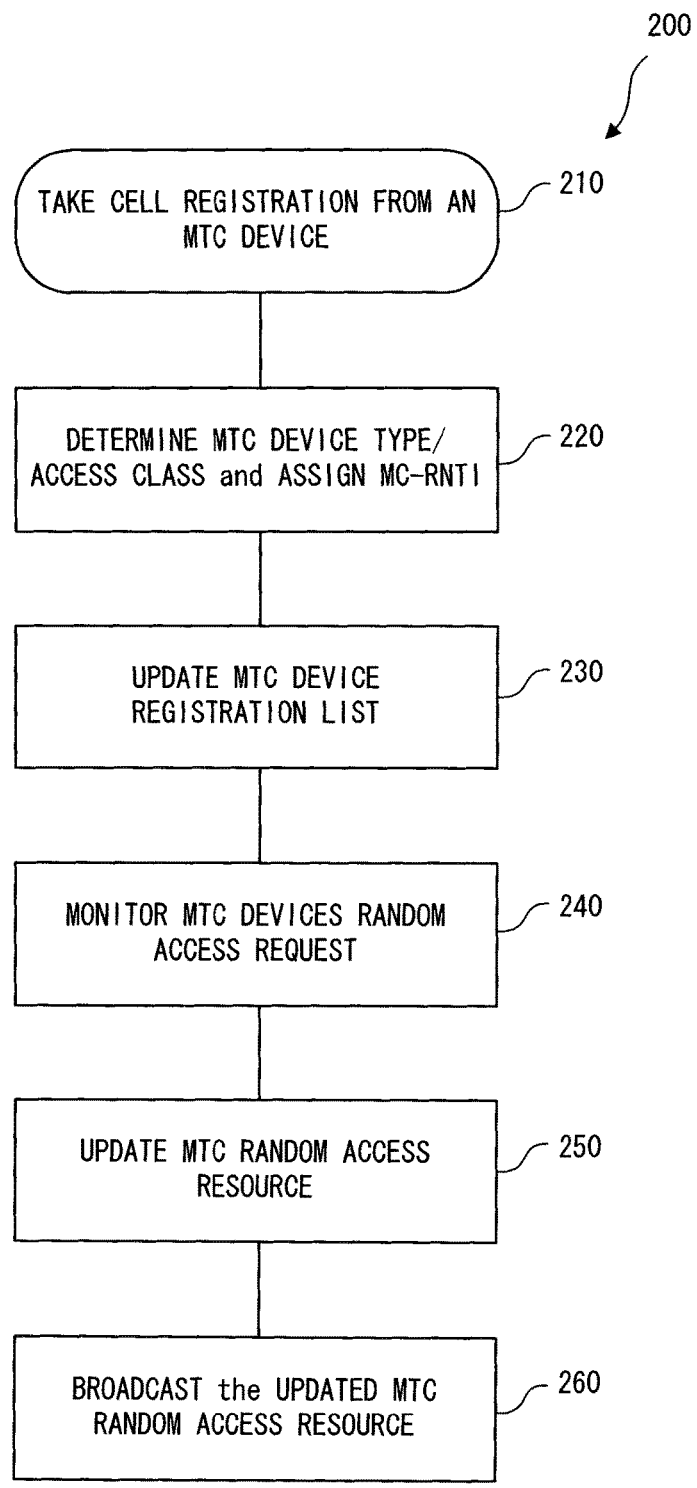
FIG. 4 is a flow chart showing an eNodeB implementing an access control scheme according to an embodiment of the present invention.

FIG. 4 illustrates an exemplary procedure 200 implemented by an eNB 50 of FIG. 1 for allocating cell random access resource and controlling the network access of MTC devices of specific class MTC 30 40. Initially, when no MTC device of special access class has been registered, the eNB 50 random access resources are allocated and shared amongst non-MTC devices 10 and MTC devices 20 of general access class MTC. In this case, the eNB 50 random access resource is broadcasted as system information and/or MTC system information.

The procedure 200 shown in FIG. 4 begins when an MTC device makes an initial registration with the serving eNB 50 and its MTC server 90. The initial registration of the MTC device 20 30 triggers the eNB 50 to take cell registration 210 of the MTC device 20 30. Based on information provided by the MTC device 20 30 under cell registration, the eNB 50 then determines MTC device type and its access class and assigns a permanent and unique MC-RNTI to the MTC device 20 30 if the registering MTC device belongs to specific access class MTC (MTC device 30) as described above to form the registered MTC device 40. In the example, the assigned MC-RNTI is provided in logical order based on first come first serve basis. The latest assigned MC-RNTI thus represents the number of registered MTC devices 40 of the special access class MTC within the serving eNB 50. In the example, a registered MTC device 40 of specific class MTC is deregistered or detected as being unauthorised and removed from its serving eNB 50. The eNB 50 performs MC-RNTI reassigning to all valid registered MTC devices 41 of specific class MTC within the serving eNB 50 to ensure all assigned MC-RNTIs are sequential. That is, with reference to FIG. 4, the eNB 50 updates 230 MTC device registration list when there is a change in number of MTC devices of special access class MTC.

The list of registered MTC devices 41 of specific access class MTC provide the eNB 50 with information at a particular frame and subframe to control:
  i. Number of specific class MTC devices 40 that are allowed to send random access preamble
  ii. Group of specific class MTC devices 40 with specific MC-RNTI(s) that are allowed to send random access preamble
  iii. Preamble sequence selected by a particular MTC device 40 of the selected group in (ii).

At specified time and frequency allocations, the eNB 50 continues monitoring 240 random access requests from the registered specific access class MTC devices 41 in its serving area for a SURGE in random access requests. The SURGE in random access requests is declared when all random access resource allocated to specific access class MTC 41 have been used up and detected by the eNB 50 at a specific time (radio frame and subframe number).

A SURGE is detected the eNB 50 updates 250 the MTC random access resource in the following way, based on:
1. the total random access resource allocated to specific access class MTC devices 41 in the current MTC SI (MTC System Information) cycle, and
2. the number of MTC devices of specific class MTC 41 that have been successfully issued random access response by the eNB 50.

When such as SURGE is detected, the eNB 50 derives:
i. the remaining random access resource allocated to specific access class MTC devices 41 in the current MTC SI cycle,
ii. the number MTC devices of specific access class MTC 41 which will be accommodated with the remaining random access resource in the current MTC SI cycle, and
iii. the remaining MTC devices of specific class MTC 41 that require random access resource in the next MTC SI cycle.

Further, the eNB 50 decides whether:
1. to increase the random access resource in the next MTC SI cycle by
   a. utilising wholly or partially shared random access resource 140, and/or
   b. allocating additional subframe(s) for dedicated random access resource 180 to accommodate the remaining MTC devices of specific class MTC 41 derived in (iii) above, or
2. to decrease the random access resource in the next MTC SI cycle by
   a. reducing partially or wholly shared random access resource 140, and/or
   b. reducing partially or wholly the dedicated random access resource 180 to accommodate the remaining MTC devices of specific class MTC 41 derived in (iii) above, or
3. to maintain the same random access resource in the next MTC SI cycle if the random access resource for specific access class MTC is at minimum level (default level) or the current random access resource is sufficient to accommodate the remaining MTC devices of specific class MTC 41 derived in (iii) above. If there is no remaining MTC devices of specific class MTC 41, the random access resource for specific access class MTC can be reduced to default level—the minimum random access resource allocated to specific access class MTC 160 in the next MTC SI cycle.

The updated MTC random access resource for specific access class MTC is then broadcasted 260 on cell MTC system information and this will be read only by specific access class MTC devices 40. The specific access class MTC devices' random access resource may be transmitted along with cell System Information or in MTC System information depending on the specific implementation of MTC system information broadcasting.

In the example, with the above access control (with assigned MC-RNTI) method, the eNB 50 can:
i. minimise or eliminate the overload of random access on a frame and subframe basis,
ii. systematically and sequentially allocate random access resource to a particular group of specific access class MTC devices with a particular assigned MC-RNTI on a frame and subframe basis, and
iii. detect a SURGE of random access requests from specific access class MTC devices and hence allocate additional random access resource dynamically.

Figure 5:
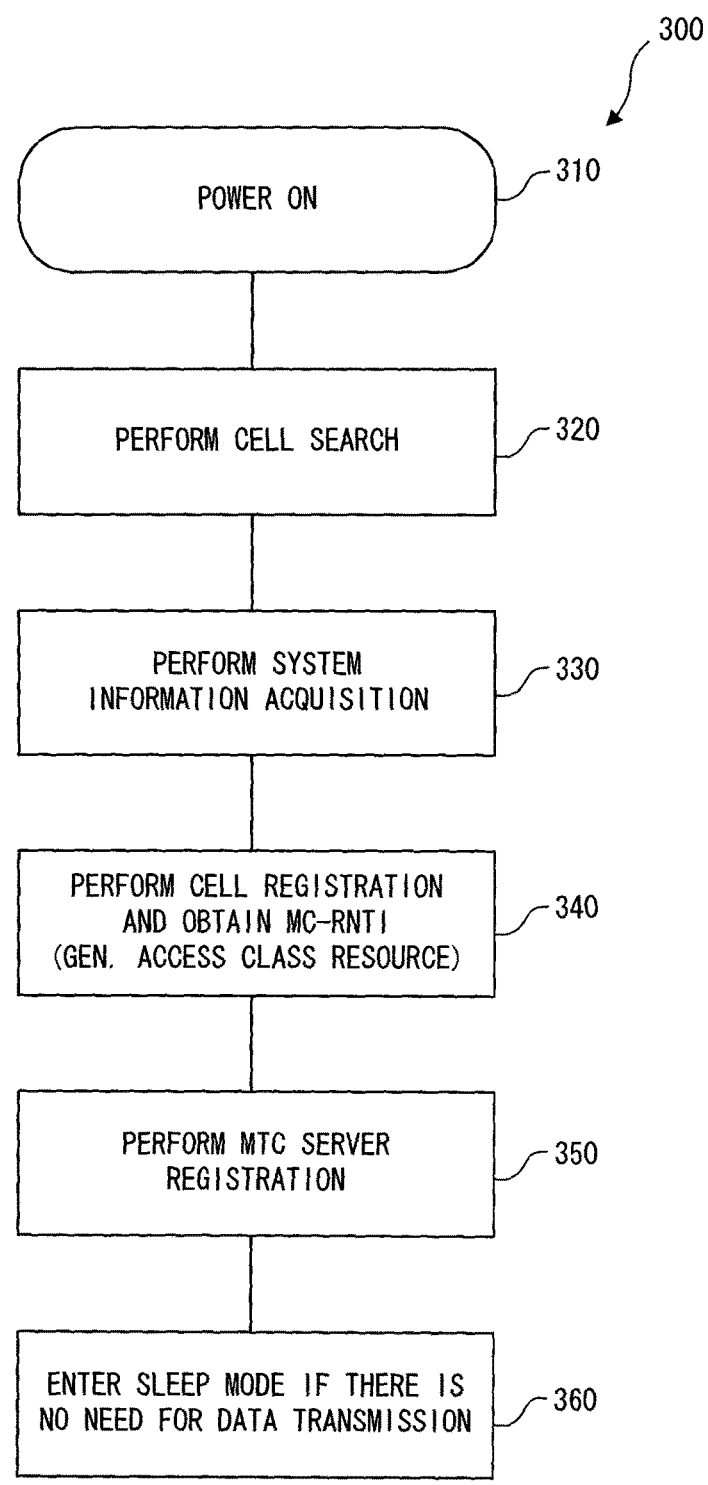
FIG. 5 is a flow chart showing a wireless terminal implementing an access control scheme according to an embodiment of the present invention.

FIG. 5 illustrates another exemplary procedure 300 implemented by a MTC device 20, 30, 40. The procedure 300 is triggered when such an MTC device is powered on 310, which is followed by cell search function 320 and system information acquisition function 330 in which it shall read cell system information. If such a MTC device is configured to support an application that classifies it as a specific access class MTC device 30, it shall continue performing a registration function 340, which includes:
i. reading MTC system information including information for general access class MTC random resource, and
ii. performing initial random access to get registered with the eNB 50 and assigned a cell life-time MC-RNTI.

Once the MTC device 30 is successfully registered with the eNB 50 of the wireless network 500 in function 340, it proceeds with performing a registration function 350 with its server (MTC 90 of FIG. 1). During this registration process 350, the MTC device 30 also provides its assigned MC-RNTI to its MTC server 90 for maintaining and tracking the MTC device for, say, monitoring for illegal removal.

After a successful registration process in 340 and 350, the MTC device 30 of specific access class changes its status to MTC device 40, as shown in FIG. 1. If the MTC device has no data for transmission as well as reception after the registration process 350, it shall enter the sleep mode to conserve its power as per function 360 of FIG. 5.

Figure 6:
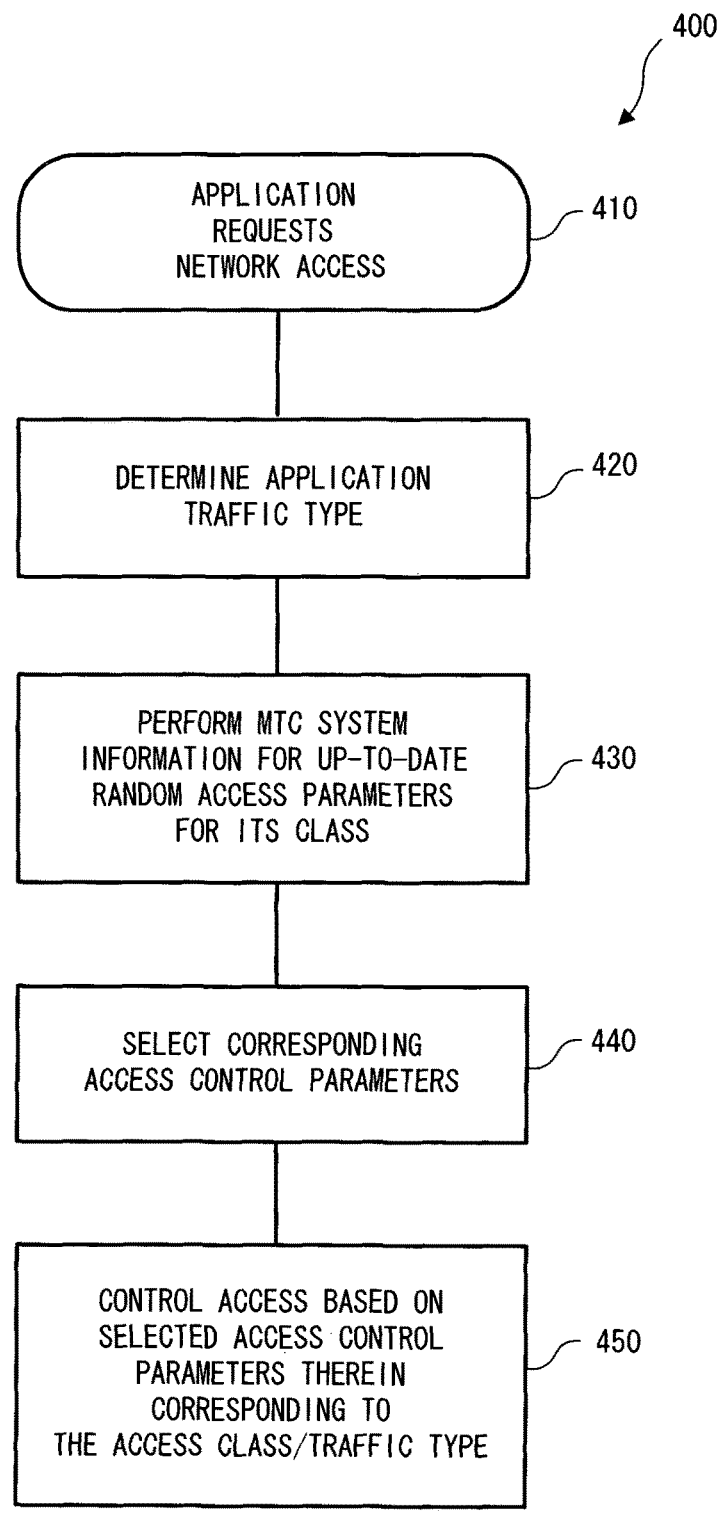
FIG. 6 is a flow chart showing a wireless terminal implementing an access control scheme according to an embodiment of the present invention.

FIG. 6 illustrates a further exemplary procedure 400 implemented by a MTC device 20 30 40. This procedure is only executed after an MTC device has successfully been classified as specific access class MTC, been registered with the eNB 50, the MTC server 90 and been assigned the MC-RNTI through the procedure 300 of FIG. 5.

The procedure 400 is triggered when the MTC device 40 is requested to send information or application data to the network via the eNB 50. When the MTC device's application has data to send, the MTC device 40 determines the appropriate application traffic type 420 and performs reading of the broadcasted MTC system information 430 for up-to-date random access parameters for its class. From the read random access parameters, the MTC device 40 then selects the appropriate access control parameters 440 corresponding to its determined traffic class. Further, the access control function 450 performs network control access based on the selected access control parameter. The access control function 450 uses the assigned MC-RNTI and the selected access control parameters to determine:
i. System Frame number and Uplink subframe number on which it shall send its random access preamble(s),
ii. Preamble sequence in the set of preamble sequences of the determined frame and subframe.

Referring now to FIG. 7 there is a shown a summary of a method 600 of controlling access to a wireless communication network according to an embodiment of the present invention. The method includes assigning 610 network identification to ones of the MTC devices of a specified access class which substantially simultaneously request network access to the wireless communications network when a trigger event affects said ones of the MTC devices of the specified access class, monitoring 620 the MTC devices of the specified access class for detection of a surge in network access requests to the wireless communications network indicative of the trigger event, dynamically allocating 630 random access resource of the wireless communications network to the MTC devices of the specified access class when said surge is detected, and communicating 640 information indicative of the dynamically allocated random access resource to the MTC devices of the specified access class based on respective ones of the network identification so that the MTC devices of the specified access class can be configured to access the wireless communication network based on the information.

It is to be understood that various alterations, additions and/or modifications may be made to the parts previously described without departing from the ambit of the present invention, and that, in the light of the above teachings, the present invention may be implemented in software, firmware and/or hardware in a variety of manners as would be understood by the skilled person.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

Throughout the description and claims of this specification, the word "comprise" and variations of the word, such as "comprising" and "comprises", is not intended to exclude other additives, components, integers or steps.

This application is based upon and claims the benefit of priority from Australian Patent Application No. 2012900601, filed on Feb. 17, 2012, the disclosure of which is incorporated herein in its entirety by reference.

REFERENCE SIGNS LIST

10 NON-MTC DEVICE (MOBILE TERMINAL:MT)
20, 30, 40 MTC DEVICE
50 ENHANCED NODEB (ENB)
60 MOBILE COMMUNICATION NETWORK
70 EXTERNAL IP NETWORK
80 MTC GATEWAY (MTC GW)
90 MTC SERVER
500 WIRELESS COMMUNICATION NETWORK

The invention claimed is:

1. A method of controlling machine-type communications (MTC) in a wireless communications network, the method comprising:
    assigning network identification to second MTC devices of a specified access class to change the second MCT devices to first MTC devices of the specified access class;
    registering a list which includes the network identification of the first MTC devices of the specified access class;
    monitoring the first MTC devices of the specified access class for detection of a surge in network access requests to the wireless communications network indicative of a trigger event;
    dynamically allocating a random access resource of the wireless communications network to the first MTC devices of the specified access class in response to the surge when the surge is detected;
    communicating information indicative of the dynamically allocated random access resource to the first MTC devices of the specified access class based on the network identification so that the first MTC devices of the specified access class is configured to access the wireless communication network based on the information; and
    reassigning, when a certain first MTC device included in the first MTC devices is deregistered or detected as being unauthorized, the network identification to the first devices of the specified access class other than the certain first MTC device,
    wherein the specified access class substantially simultaneously requests network access to the wireless communications network in response to the trigger event that affects the first MTC devices of the specified access class.

2. The method according to claim 1, wherein the second MTC devices assigned with the network identification changes to the first MTC devices when the second MTC devices assigned with network identification are registered successfully.

3. The method as claimed in claim 1, further comprising:
    allocating a minimum random access resource of the wireless communications network to the first MTC devices of the specified access class based on the list.

4. The method as claimed in claim 3, further comprising:
    allocating a minimum random access resource of the wireless communications network to a third MTC device of a general access class,
    wherein the third MTC device requests network access to the wireless communications network individually and/or requests network access according to a preconfigured access scheme.

5. The method as claimed in claim 4, further comprising:
    allocating a shared random access resource of the wireless communications network to the third MTC device of the general access class and the first MTC devices of the specified access class based on the list, and dynamically allocating at least some of the shared random access resource to the first MTC devices of the specified access class when the surge is detected.

6. The method as claimed in claim 5, further comprising:
    allocating a dedicated random access resource of the wireless communications network to the first MTC devices of the specified access class based on the list, and dynamically allocating the dedicated random access resource to the first MTC devices of the specified access class when the surge is detected.

7. The method as claimed in claim 1, further comprising:
    registering the list of the network identification of each of the first MTC devices of the specified access class on an MTC server configured to receive information from the first MTC devices via the wireless communications network.

8. The method as claimed in claim 7, further comprising:
    the MTC server monitoring for a change in the number of MTC devices of the specified access class registered in the list in the wireless communications network for maintenance and/or tracking of the first MTC devices of the specified access class in the wireless communications network.

9. A server for machine-type communications (MTC) in a wireless communications network, the server comprising:
    a processor device;
    a network communication interface in communication with the processor device; and
    at least one of i) a memory in connection with the processor device, the memory having stored therein processor-readable programming code stored therein, and ii) circuitry configured to cause the processor device to operate in a predetermined manner, the programming code and/or the circuitry configured in a manner to cause the processor device:

assign network identification to second MTC devices of a specified access class to change the second MTC devices to first MTC devices of the specified access class;

register a list which includes the network identification of the first MTC devices of the specified access class;

monitor the first MTC devices of the specified access class for detection of a surge in network access requests to the wireless communications network indicative of a trigger event;

dynamically allocate a random access resource of the wireless communications network to the first MTC devices of the specified access class in response to the surge when the surge is detected; and communicate information indicative of the dynamically allocated random access resource to the first MTC devices of the specified access class based on the network identification so that the first MTC devices of the specified access class is configured to access the wireless communication network based on the information; and reassign, when a certain first MTC device included in the first MTC devices is deregistered or detected as being unauthorized, the network identification to the first devices of the specified access class other than the certain first MTC device, wherein the specified access class substantially simultaneously requests network access to the wireless communications network in response to the trigger event that affects the first MTC devices of the specified access class.

10. The server as claimed in claim 9, wherein the server operates as a base station in the wireless communications network.

* * * * *